PROCESS FOR PREVENTING RUSSETING OF POTATO TUBERS
John H. Nelson, % Nelson Laboratories, 1145 W. Freemont St., Stockton 3, Calif.
No Drawing. Filed May 2, 1961, Ser. No. 107,064
3 Claims. (Cl. 71—1)

This invention relates to the treatment of plants and has particular reference to processes and compositions for the treatment of potato plants.

The development of a russet-like periderm in certain varieties of potatoes has become increasingly troublesome in several potato growing areas of the country. This condition, commonly known as "rust," is a serious "disease" in that the marketability of potatoes so affected is adversely affected. The condition is particularly prevalent in the smooth skinned White Rose potato, the principal California Long White potato grown in that State, and is also found in Kennebec, Pontiac and Sebago varieties when grown in highly organic soils. Mild forms of russeting also occurs in mineral soils in some areas.

A primary object of the present invention is to provide novel processes and compositions for the treatment of potato plants to prevent the russeting of the potato tubers produced therefrom.

Another object of the present invention is to provide anti-russeting compositions which are relatively inexpensive and easy to apply.

Other objects and advantages of the present invention it is believed will be readily apparent from the following detailed description of preferred embodiments thereof.

Briefly, this invention comprehends within its scope the discoveries (1) that the soils in which "rusty" potatoes are grown are deficient in certain metals, particularly aluminum, as well as the commonly recognized nutrient elements zinc, manganese and copper, and to a degree in some cases, the nutrient element iron, and (2) that the condition is cured by the application to the plants of aluminum in readily available form, either alone or together with one or more of the other nutrient metals in readily available form.

In carrying out the process of the present invention, the aluminum and the other metals (if used) are preferably applied to the plants by spraying upon the leaves thereof aqueous solutions of the metals in non-toxic, readily available forms such as the sulfate salts thereof or in the form of complex or chelated compounds thereof. Alternately, although less desirably, such compounds can be applied to the soil as a side dressing.

The following specific examples are illustrative of the processes and compositions of this invention, but it is to be understood that the invention is not to be limited to the specific details thereof:

*Example 1*

White Rose potato plants between 60 and 80 days old were sprayed, taking care to well bathe both the undersides and tops of the leaves, with the following solution (in 100 gallons of water):

One pound zinc sulfate ($ZnSO_4 \cdot H_2O = 36.07\%$ Zn)
One pound aluminum sulfate ($Al_2(SO_4)_3 \cdot 18H_2O = 5.50\%$ Al)
One pound manganous sulfate ($MnSO_4 \cdot 2H_2O = 32.50\%$ Mn)
One pound cupric sulfate ($CuSO_4 \cdot 5H_2O = 25.50\%$ Cu)
Six ounces "Triton" N–101 spreader (Rohm & Haas Co.)
Nine grams ground rock gypsom ($CaSO_4 \cdot 2H_2O$)

At harvest time 10 feet of row were hand dug from each treated row as well as from a control row. After washing, the tubers from each treatment were counted and weighed. There was no significant difference between any of the lots. This was done to determine if any of the treatments had reduced yields.

Tubers produced by the plants sprayed with the above composition showed the following conditions as compared to tubers from control plants not sprayed: the tubers were free from russet-like periderm development; the skin on the treated tubers was much whiter than the yellowed white on the controls; the tubers were much improved as to type for White Rose potatoes; the eyes on the treated tubers were much more shallow than those on the untreated; internal stem end discoloration was less in the tubers from sprayed plants.

*Example 2*

The following solution was used in the same manner as in Example 1 with similar although somewhat less effective results:

One pound zinc chelate ("Sequestrene," by Geigy Chemical Co., 14.2% Zn)
One pound aluminum sulfate ($Al_2(SO_4)_3 \cdot 18H_2O = 5.50\%$ Al)
One-half pound manganese chelate ("Sequestrene," by Geigy Chemical Co., 12.0% Mn)
One-half pound copper chelate ("Sequestrene," by Geigy Chemical Co., 13.0% Cu)
One-half pound iron chelate ("Sequestrene," by Geigy Chemical Co., 10.5% Fe)
Six ounces "Ortho" X–77 spreader
One hundred gallons water The metals must be used in dilute solution form to avoid damage to the plant foliage, e.g., in the range of from about .05 to about 0.25% by weight of the sulfate salt thereof, based upon the weight of the entire solution. The relative amounts of the several metal compounds can be varied, preferably not more than about 50% above the below the amounts set forth in the examples.

Having fully described my invention, it is to be understood that I do not wish to be limited to the details set forth, but my invention is of the full scope of the appended claims.

I claim:

1. A process for the treatment of potato plants for the prevention of russeting of the potato tubers, which comprises applying to the plants an aqueous solution containing from about 0.05 to about 0.25% by weight, of aluminum sulfate and an element selected from the group consisting of zinc, manganese, copper, iron and mixtures thereof, said elements being in readily available form.

2. A process for the prevention of russeting of potato tubers, comprising spraying onto the foliage of the potato plant an aqueous solution containing from about 0.05 to about 0.25% by weight of aluminum sulfate.

3. A process for the prevention of russeting of potato tubers, comprising spraying onto the foliage of the potato plant a composition comprising a dilute aqueous solution containing from about 0.05 to about 0.25% by weight, of aluminum sulfate and a sulfate salt selected from the group consisting of zinc sulfate, manganous sulfate, copper sulfate, iron sulfate and mixture thereof.

References Cited in the file of this patent

UNITED STATES PATENTS

| | | |
|---|---|---|
| 2,230,931 | Bussert | Feb. 4, 1941 |
| 2,350,982 | Borst | June 13, 1944 |
| 2,920,950 | Heise et al. | Jan. 12, 1960 |
| 2,976,138 | Hester | Mar. 21, 1961 |

OTHER REFERENCES

A Catalogue of Insecticides and Fungicides, Frear, D. H., vol. 2, page 49, 1948.

Dorozkkin et al.: "Chemical Abstracts," vol. 50, 1956, page 11588.